Nov. 16, 1926.
E. G. THOMAS
PACKING SCALE
Filed April 14, 1922  4 Sheets-Sheet 1
1,606,970
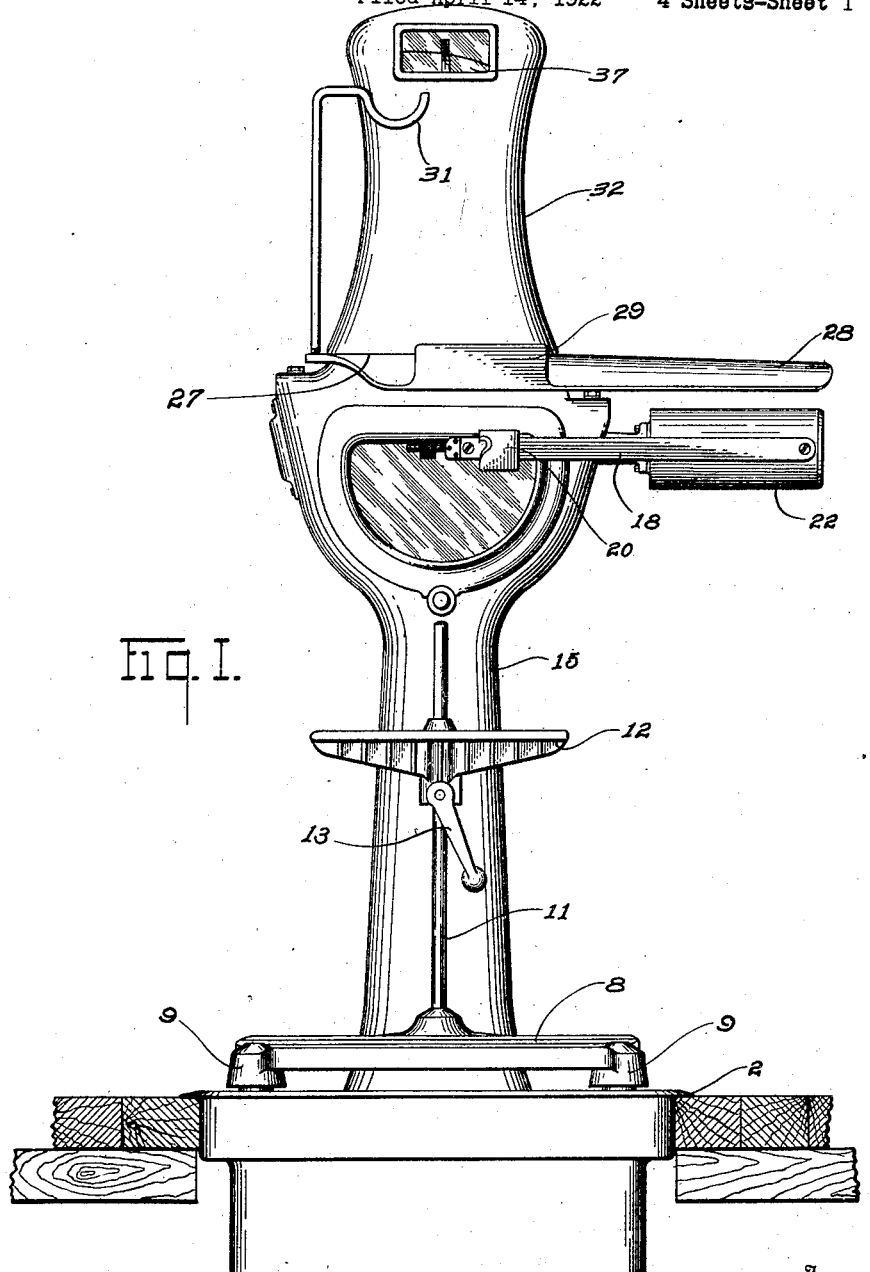
Fig. I.
Inventor
EDWARD G. THOMAS.
By C. D. Marshall
Attorney

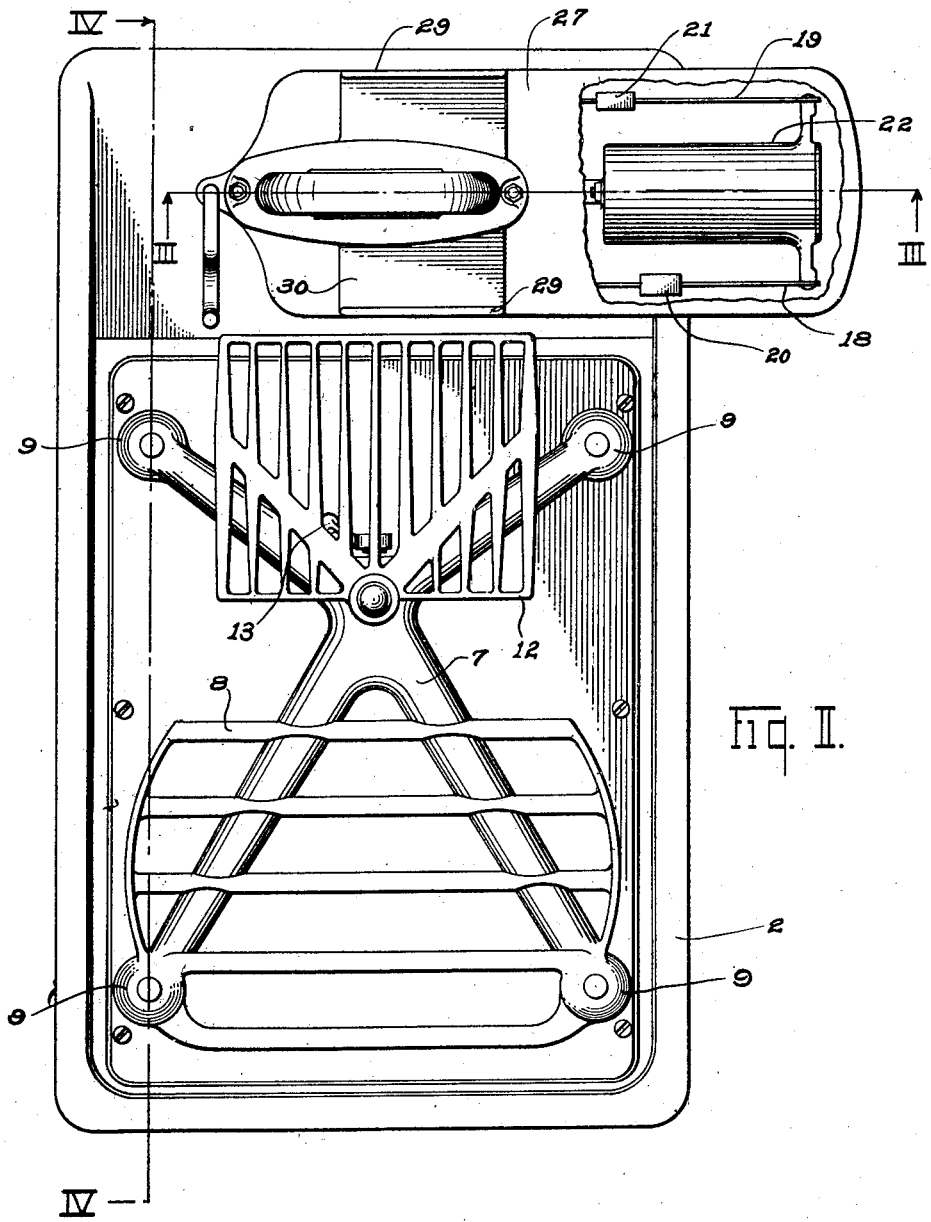

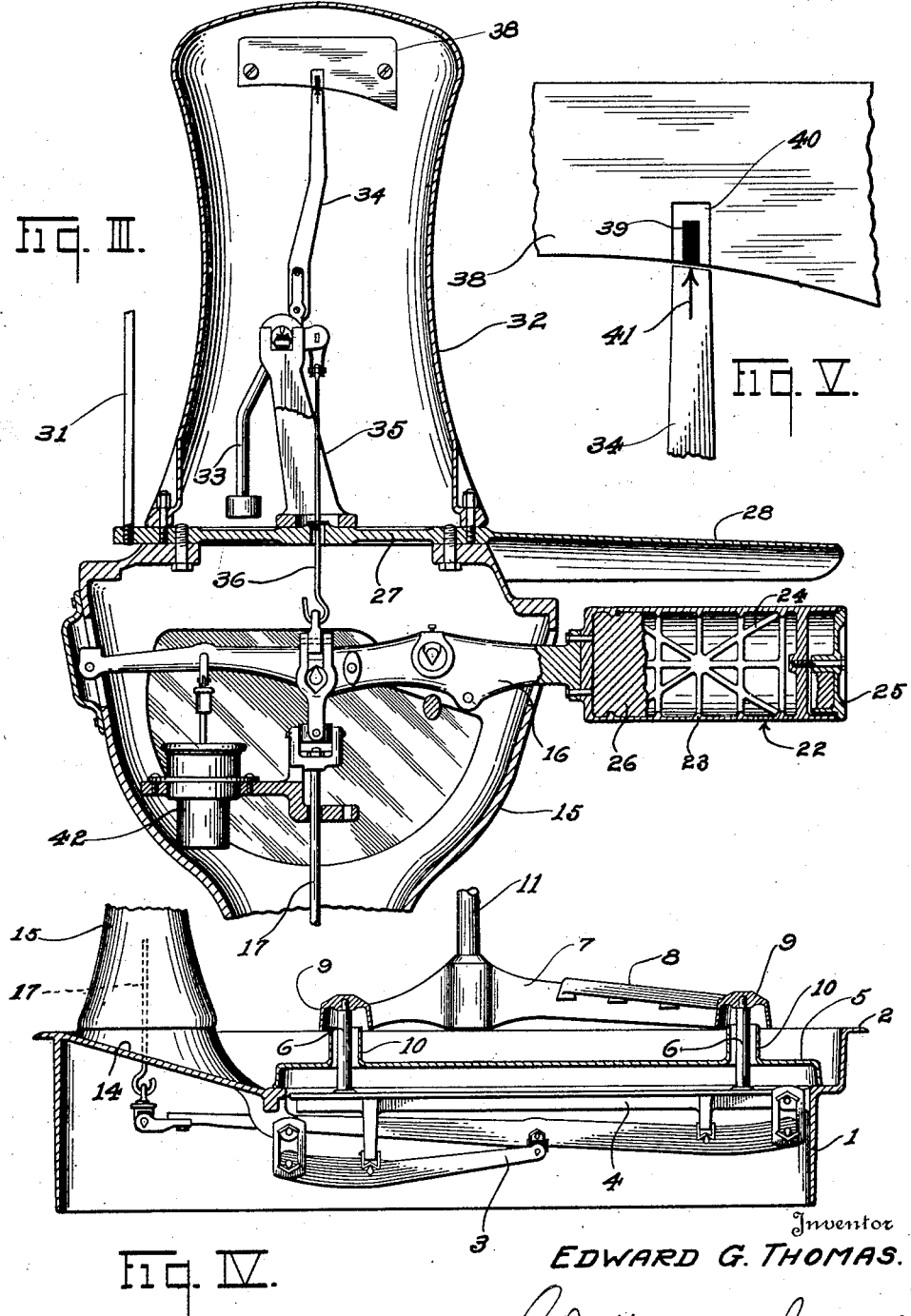

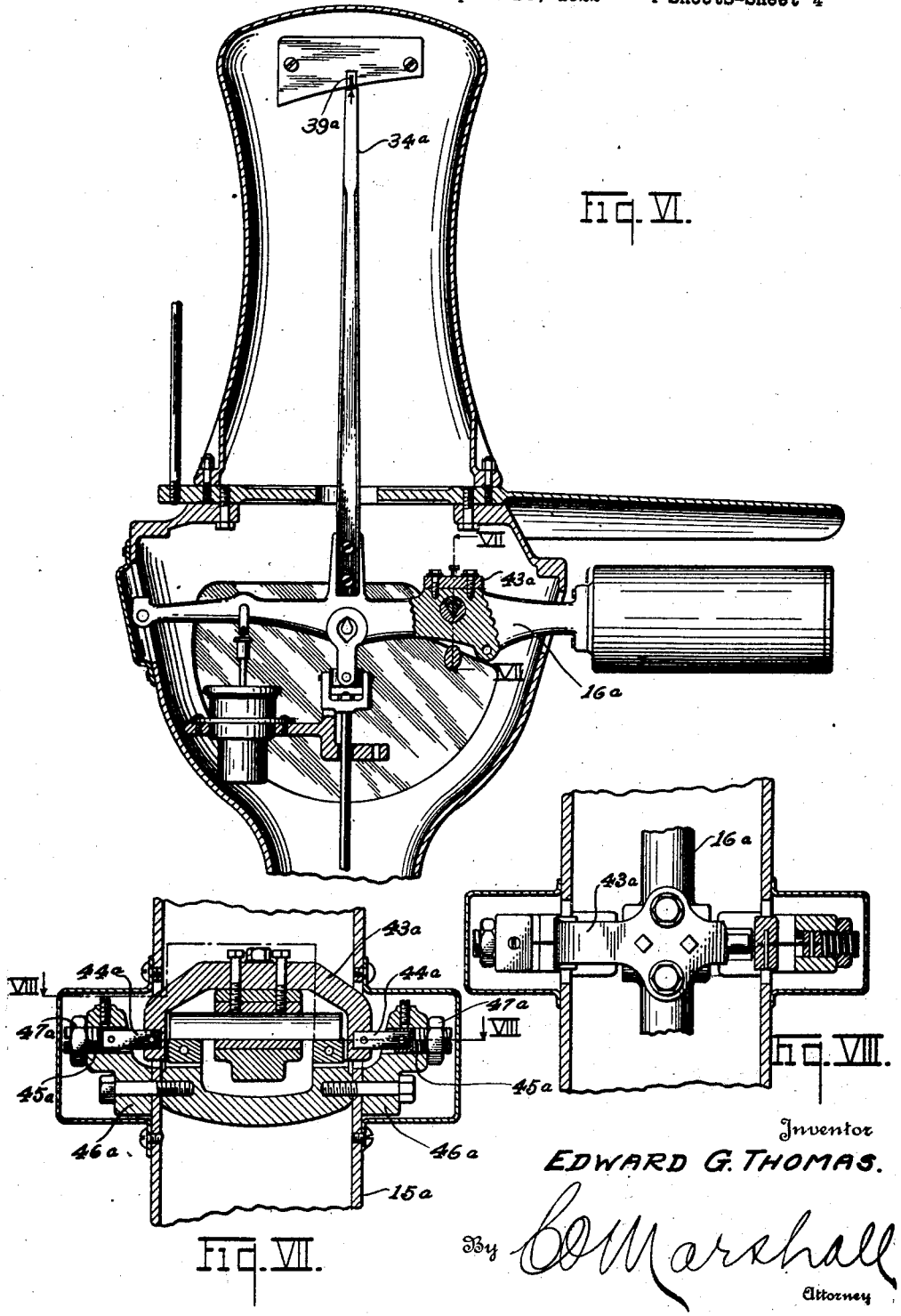

Patented Nov. 16, 1926.

1,606,970

UNITED STATES PATENT OFFICE.

EDWARD G. THOMAS, OF TOLEDO, OHIO, ASSIGNOR TO TOLEDO SCALE COMPANY, OF TOLEDO, OHIO, A CORPORATION OF NEW JERSEY.

PACKING SCALE.

Application filed April 14, 1922. Serial No. 552,763.

This invention relates to predetermined weight scales, and particularly to scales for packing comminuted commodities.

One of the principal objects of the invention is the provision of a predetermined weight scale of comparatively great capacity having a very sensitive indicator whereby heavy packages may be brought to a substantially uniform weight.

Another object of the invention is the provision of a scale which may be used in dusty atmospheres for considerable periods without being injuriously affected by deposits of dust upon its working parts.

Another object is the provision of a scale, having a commodity-receiver for heavy commodities, supported upon a base which is so constructed that the commodity-receiver is supported at a very slight elevation above the floor surrounding the base.

Another object is to provide a scale of this type having a base so constructed that deposits of material may be easily removed from its upper surface.

Another object is the provision of a scale having a commodity-receiver of grid formation for heavy commodities and an auxiliary commodity-receiver of grid formation for light commodities, and means whereby said auxiliary commodity-receiver may be adjusted in height and moved into and out of convenient position for receiving commodities.

Another object is the provision of a predetermined weight scale having beam weighing mechanism substantially symmetrically arranged, whereby unbalanced overhanging portions are avoided.

Another object is the provision of novel adjustable means for counterbalancing the weight of the commodity-receivers and other parts of the weighing mechanism of the scale.

Another object is to provide an accurate and sensitive auxiliary automatic load-offsetting and indicating device in combination with beam weighing mechanism of comparatively great capacity.

Another object is the provision of an easily read indicator having a predetermined weight mark capable of being used with different tolerances.

Still another object is the provision of a novel substantially dust-proof housing for the automatic load-offsetting and indicating mechanism of the scale.

Other objects and advantages will be apparent from the following description, in which reference is had to the accompanying drawings illustrating preferred embodiments of my invention and wherein similar reference numerals designate similar parts throughout the several views.

In the drawings:—

Figure I is a front elevational view showing a scale embodying my invention;

Figure II is a plan view thereof, a part being broken away to show the arrangement of the weighing beams;

Figure III is an enlarged fragmentary vertical sectional view taken substantially on the line III—III of Figure II;

Figure IV is a vertical sectional view taken substantially on the line IV—IV of Figure II;

Figure V is an enlarged fragmentary elevational view showing the predetermined weight indicator employed in the scale of my invention;

Figure VI is a view similar to that of Figure III showing a modified form of the invention;

Figure VII is a fragmentary vertical sectional view taken on the line VII—VII of Figure VI; and Figure VIII is a fragmentary horizontal sectional view taken substantially on the line VIII—VIII of Figure VII.

Referring to the drawings in detail, the base 1 of the scale is provided with a horizontally-extending flange 2 surrounding its top so that the body of the base may be sunk within an opening in the supporting floor, with the flange 2 lying on the upper surface thereof. The outer edge of the flange 2 is beveled, as shown in Figures I and IV, so that when the scale is in place the upper surface of the flange merges into the upper surface of the floor.

The platform lever mechanism of the scale may be of any preferred type. It is supported within the base 1 and in turn supports a frame or spider 4 which is also located within the base 1. A removable cover 5 supported within the base 1 overlies the platform levers 2 and the frame or spider 4 and catches the commodity which is accidentally spilled during weighing operations, and thus prevents it from lodging upon the frame 4 and levers 3 and thereby affecting the accuracy of the scale.

Supported upon the frame or spider 4 are four uprights 6 which extend upwardly through openings which are provided in the cover 5, and supported upon the said uprights 6 is a commodity-receiver consisting of a frame 7 and a grid 8. The portions 9 of the frame adjacent the uprights 6 are formed like inverted cups, and the openings in the cover 5 through which the uprights 6 extend are surrounded by vertical flanges 10, the upper edges of which lie within the cup-like formations 9. This arrangement effectually prevents the ingress of spilled commodity into the base 1.

Secured upon the commodity-receiver frame 7 is a vertically-extending post 11 upon which is slidably and rotatably mounted a small grid 12 which may be fastened in any adjusted position upon the post 11 by means of a set screw having a handle 13. When the scale is to be used for weighing light packages, such, for example, as 12 lb. sacks of flour, the small grid 12 is turned into the position shown in Figure I. When the scale is to be used for weighing heavy packages, such, for example, as 48 or 96 lb. sacks of flour, the small grid is turned into the position shown in Figure II, in which position it does not extend over the large grid 8, but in which its forward edge forms a rest against which the upper part of a sack of flour or other commodity may be leaned. The height of the small grid 12 may be adjusted by loosening the set screw and moving it up or down on the post 11. A sloping deck 14 is formed within the rear end of the base 1, so that the material which accumulates on the base and cover 5 may be easily swept off, and supported upon the sloping deck 14 is a hollow column 15 which supports a beam lever 16 that is connected to the platform lever mechanism 3 by means of a steelyard rod 17.

The beam lever 16 is provided with two beams 18 and 19, the beam 18 being located on the forward side of the column 15, while the beam 19 is located on the rearward side thereof. The beams 18 and 19 carry poises 20 and 21, and, since one of the beams is located in front of and one at the rear of the column 15, the overhanging weight of each is balanced by the overhanging weight of the other.

The beam lever 15 is equipped with a counterweight 22 which substantially counterbalances or floats the commodity-receiver and the platform lever mechanism. The counterweight 22 consists of a substantially cylindrical shell 23 having ribs 24 formed upon its interior walls and having an auxiliary weighted member 25 rotatably mounted within one of its ends. The shell 23 contains a quantity of lead 26 or other heavy material, sufficient to bring it to the required weight, which has been poured into the shell in a molten state and which is held against shifting therein by the ribs 24. The auxiliary weighted member 25 also contains a quantity of lead or similar material which is eccentrically placed in respect of the axis of rotation of the auxiliary weighted member, said axis being substantially horizontal so that by rotating the auxiliary weighted member and thus raising or lowering its center of mass, the pendulum effect of the lever mechanism of the scale may be increased or diminished.

Secured upon the upper end of the column 15 is a plate 27 which crosses the upper end of the column and extends outwardly therefrom to form a shield 28 overlying the counterweight 22 and the beams 18 and 19. Upturned lips 29 are formed upon the shield 28 and the portions 30 of the shield immediately back of the flanges 29 are depressed and flattened to form a receptacle for tags such as are attached to certain commodities which are packed in sacks. A hook 31 to support twine for tying sacks extends upwardly from the plate 27.

Supported upon the upper end of the column 15 is a substantially dust proof housing 32 which contains automatic load-offsetting and indicating mechanism, consisting of a pendulum 33 and an indicator 34 rigidly secured together and pivotally mounted on a bracket 35 which is supported upon the plate 27 and located within the housing 32. The pendulum 33 is connected to the beam lever 16 by means of a link 36, which passes through an opening in the plate 27, so that when a load is placed upon the platform and the steelyard rod 17 is pulled downwardly, the link 36 is also pulled downwardly and the pendulum 33 swings outwardly and upwardly.

In the upper part of the front face of the housing 32 is a glazed window 37 through which a stationary chart 38 and the hand of the indicator 34 are visible. The stationary chart may, if desired, be marked with a predetermined weight mark and graduations indicating ounces over and under the predetermined weight. I prefer, however, to mark the chart with a predetermined weight mark 39 of one color and of a definite width surrounded by a predetermined weight mark 40 of another color and of greater width. If it be desired to weigh within a small tolerance, the operator is required to adjust the quantity of the commodity on the scale until the point of an arrow 41 marked upon the indicator 34 registers with the lower end of the narrower mark 39. If a greater tolerance is to be allowed, the arrow need only be brought into registration with some part of the lower end of the combined marks 39 and 40.

The mechanism of the scale is so proportioned and balanced that when there is no load on the commodity-receiver and the poises 20 and 21 are adjacent the left ends of the beams 18 and 19, the indicator will stand adjacent the position in which it is shown in Figure III. When the scale is to be set for weighing a commodity or checking the weight thereof, a test weight of exactly the required commodity weight is placed upon the commodity-receiver and the poises 20 and 21 are moved to the right on the beams 18 and 19 until the indicator 34 is brought into exact registration with the center of the predetermined mark 39. Supposing a 48 lb. weight to be placed upon the commodity-receiver and the poises set in such positions that the indicator hand registers with the predetermined weight mark, it is apparent that if the weight be removed and a commodity of the same weight be placed on the commodity-receiver, the indicator will again assume a position in registration with the predetermined weight mark. If the commodity be under-weight, the indicator will stand at the left of the predetermined weight mark, and if the commodity be over-weight, the indicator will move to the right of the predetermined weight mark. The scale when so used provides a very accurate device for weighing commodities in comparatively heavy packages.

In order to bring the indicator quickly to a standstill in weighing position, a dash pot damping device 42 of the type commonly employed in automatic scales is supported within the column 15 and connected to the lever 16.

The form of device shown in Figures VI, VII and VIII differs from that above described only in that a torsion lever is substituted for the pendulum 33 as a means to automatically bring the scale to predetermined position when the load on the commodity-receiver is exactly counterbalanced. In this form of the device a bracket 43$^a$ is fixed upon the lever 16$^a$ and extends downwardly over the ends of the fulcrum pivot of the lever, as shown in Figure VII. Secured to the bracket 43$^a$ and extending outwardly therefrom in alignment with the knife-edge of the fulcrum pivot is a pair of flexible steel ribbons 44$^a$, the outer ends of the ribbons being connected to plugs 45$^a$ which are rotatably mounted in brackets 46$^a$ secured to the column 15$^a$. The plugs 45$^a$ may be drawn outwardly by means of nuts 47$^a$ and the ribbons 44$^a$ thus tightened to any desired extent, and by turning the plugs 45$^a$ in the brackets 46$^a$ the ribbons may be so arranged that they are under no torsional strain when the load on the platform is exactly counterbalanced by the poises on the beams carried by the lever 16$^a$ and the indicator 34$^a$ is in registration with the predetermined weight mark 39$^a$. The ribbons 44$^a$, therefore, offset or counterbalance no part of the load on the platform, but serve merely to resist displacement of the lever mechanism when the load is unbalanced or the scale is tipped out of level and to quickly bring the indicator into registration with the predetermined mark when the load on the platform is counterbalanced by the poises on the beams.

While it will be apparent that the illustrated embodiments of my invention herein disclosed are well calculated to adequately fulfill the objects primarily stated, it is to be understood that the invention is susceptible to variation, modification and change within the spirit and scope of the subjoined claims.

Having described my invention, I claim:

1. A commodity-receiver for weighing scales comprising, in combination, a grid, an upright supported upon said grid, a second grid, and means for adjustably securing said second grid upon said upright.

2. A commodity-receiver for weighing scales comprising, in combination, a grid, an upright supported upon said grid, a second grid, and means for slidably and rotatably securing said second grid upon said upright.

3. In a weighing scale, in combination, a base, platform levers supported within said base, a spider supported by said platform levers, a cover overlying said spider and platform levers, the upper surface of said cover lying below the upper edge of said base, uprights carried by said spider and extending upwardly through said cover, and a commodity-receiver supported upon said uprights slightly above the level of the upper edge of said base.

4. In a weighing scale, in combination, a base, platform levers supported within said base, a spider supported by said platform levers, a cover overlying said spider and platform levers, the upper surface of said cover lying below the upper edge of said base, uprights carried by said spider and extending upwardly through said cover, and a grid-like commodity-receiver supported upon said uprights slightly above the level of the upper edge of said base.

5. In a weighing scale, in combination, a base, platform levers supported within said base, a spider supported by said platform levers, a cover overlying said spider and platform levers, the upper surface of said cover lying below the upper edge of said base, uprights carried by said spider and extending upwardly through said cover, a grid-like commodity-receiver supported upon said uprights slightly above the level of the upper edge of said base, a standard secured upon said commodity-receiver, and a second commodity-receiver slidably and rotatably mounted upon said standard.

6. In a weighing scale, in combination, a base, platform lever mechanism housed within said base, a column mounted on said base, weighing mechanism supported by said column, said weighing mechanism including parts supported outside said column, and a dust shield overlying said parts.

7. In a weighing scale, in combination, a base, platform lever mechanism housed within said base, a column mounted on said base, weighing mechanism supported by said column, said weighing mechanism including beams supported outside said column, and a dust shield overlying said beams.

8. In a weighing scale, in combination, a base, platform lever mechanism housed within said base, a column mounted on said base, weighing mechanism supported by said column, said weighing mechanism including beams supported outside said column, a substantially dust-proof housing supported by said column, and automatic weighing mechanism supported within said housing.

9. An indicating device comprising, in combination, a relatively movable indicator and chart, said chart bearing a predetermined weight mark of comparatively great width, a predetermined weight mark of less width being superimposed upon the said first predetermined weight mark.

10. An indicating device comprising, in combination, a movable indicator and a stationary chart co-operating therewith, said chart bearing a predetermined weight mark of comparatively great width, a predetermined weight mark of less width being superimposed upon the said first predetermined weight mark.

EDWARD G. THOMAS.